US011386343B2

(12) United States Patent
Dodson et al.

(10) Patent No.: US 11,386,343 B2
(45) Date of Patent: Jul. 12, 2022

(54) REAL TIME DETECTION OF CYBER THREATS USING BEHAVIORAL ANALYTICS

(71) Applicant: Elasticsearch B.V., Mountain View, CA (US)

(72) Inventors: Stephen Dodson, London (GB); Thomas Veasey, York (GB)

(73) Assignee: Elasticsearch B.V., Amsterdam (NL)

(*) Notice: Subject to any disclaimer, the term of this patent is extended or adjusted under 35 U.S.C. 154(b) by 892 days.

(21) Appl. No.: 15/590,439

(22) Filed: May 9, 2017

(65) Prior Publication Data

US 2018/0330257 A1    Nov. 15, 2018

(51) Int. Cl.
*G06N 7/00*    (2006.01)
*G06N 20/00*    (2019.01)
(Continued)

(52) U.S. Cl.
CPC ........... *G06N 7/005* (2013.01); *G06F 16/212* (2019.01); *G06F 21/566* (2013.01); *G06N 20/00* (2019.01);
(Continued)

(58) Field of Classification Search
CPC ...... G06N 7/005; G06N 20/00; G06F 16/212; G06F 21/566; H04L 63/1416; H04L 63/1425
See application file for complete search history.

(56) References Cited

U.S. PATENT DOCUMENTS 8,856,598 B1 * 10/2014 Madahar ............. G06F 11/0709
714/47.2
2015/0101053 A1    4/2015 Sipple et al.
(Continued)

FOREIGN PATENT DOCUMENTS

EP             3622402 A1    3/2020
WO    WO2018208451 A1    11/2018

OTHER PUBLICATIONS

"International Search Report and Written Opinion of the International Searching Authority," Patent Cooperation Treaty Application No. PCT/US2018/028430, dated Aug. 30, 2018, 10 pages.
(Continued)

*Primary Examiner* — Alexey Shmatov
*Assistant Examiner* — Robert Bejcek, II
(74) *Attorney, Agent, or Firm* — Carr & Ferrell LLP

(57) ABSTRACT

Real time detection of cyber threats using behavioral analytics is disclosed. An example method includes obtaining, in real time, attributes for an entity within a population of entities, the attributes being indicative of entity behavior; building an entity probability model using the attributes and associated values collected over a period of time; and establishing a control portion of the entity probability model associated with a portion of the period of time. The example method includes comparing any of the entity attribute values and the entity probability model for other portions of the period of time to the control portion to identify one or more anomalous differences, and executing a remediation action based thereon. Some embodiments include determining a set comprising the anomalous differences and additional anomalous differences for the entity or the entity's peer group, and calculating the set's overall probability to determine if the entity is malicious.

20 Claims, 4 Drawing Sheets

(51) Int. Cl.
*G06F 16/21* (2019.01)
*G06F 21/56* (2013.01)
*H04L 9/40* (2022.01)

(52) U.S. Cl.
CPC ...... *H04L 63/1416* (2013.01); *H04L 63/1425* (2013.01); *G06F 2221/034* (2013.01); *H04L 63/0263* (2013.01)

(56) References Cited

U.S. PATENT DOCUMENTS

| | | | |
|---|---|---|---|
| 2015/0373039 A1* | 12/2015 | Wang | H04L 63/1425 726/23 |
| 2016/0078365 A1 | 3/2016 | Baumard | |
| 2016/0226901 A1 | 8/2016 | Baikalov et al. | |
| 2017/0063905 A1 | 3/2017 | Muddu et al. | |
| 2018/0330280 A1* | 11/2018 | Erenrich | G06N 5/04 |

OTHER PUBLICATIONS

"Extended European Search Report", European Patent Application No. 18798438, dated Dec. 10, 2020, 7 pages.
"Notice of Allowance", European Patent Application No. 1898438.0, dated Nov. 11, 2021, 7 pages.

\* cited by examiner

300

Building an entity probability model of an entity using attributes and associated attribute values of the entity collected over a period of time
305

Establishing a control entity probability model, which may include establishing a control portion of the entity probability model
310

Comparing additional portions of the entity probability model to other portions of the period of time to the control portion of the entity probability model to identify one or more anomalies in real time
315

Executing a remediation action with respect to the entity based on detection of the one or more anomalies
320

*FIG. 3*

REAL TIME DETECTION OF CYBER THREATS USING BEHAVIORAL ANALYTICS

FIELD OF THE PRESENT TECHNOLOGY

The present technology relates generally to digital security, and more particularly, but not by limitation, to systems and methods that detect anomalies in computing environments that are indicative of malicious or otherwise unwanted behavior within or performed by the computing environment.

SUMMARY

Various embodiments of the present technology include a method for real time detection of cyber threats, the method comprising: (a) obtaining, in real time, entity data for an entity; (b) building, in real time, an entity probability model of the entity from the entity data; (c) building a population probability model from entity data gathered for at least a portion of a population of entities, the population probability model being indicative of behaviors for the population of entities; (d) comparing, in real time, either at least a portion of the entity data or the entity probability model to the population probability model to identify one or more anomalous differences between either the portion of the entity data or its probability model and the population probability model; and (e) in response to the one or more anomalous differences being identified, alerting, in real time, a system administrator. In some embodiments, one or more anomalous differences may also be referred to herein variously as either anomalies or constituting an anomaly.

Various embodiments of the present technology include another method for real time detection of cyber threats, the method comprising: (a) building entity probability models of an entity using attributes and entity attribute values of the entity collected over a period of time; (b) establishing a control entity probability model, the control being associated with a portion of the period of time; (c) comparing any of the entity attribute values and an entity probability model for other portions of the period of time to the control portion of the entity probability model to identify one or more anomalous differences in real time; and (d) executing a remediation action with respect to the entity, based on identification of the one or more anomalous differences.

Various embodiments of the present technology include a system for real time detection of cyber threats comprising: (a) a processor; and (b) a memory for storing executable instructions, the processor executing the instructions to: (1) obtain, in real time, entity data for an entity within a population of entities; (2) build an entity probability model of the entity from the entity data; (3) build a population probability model from entity data gathered for at least a portion of the population of entities, the population probability model being indicative of average behavior for the population of entities; (4) compare either a portion of the entity data or the entity probability model to the population probability model to identify anomalous differences between the either a portion of the entity data or its probability model and the population probability model; and (5) in response to the anomaly being identified, alert, in real time, a system administrator.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 3 is a flowchart of an example method for real time detection of anomalies using self-referential entity data.

DETAILED DESCRIPTION

Figure 1:
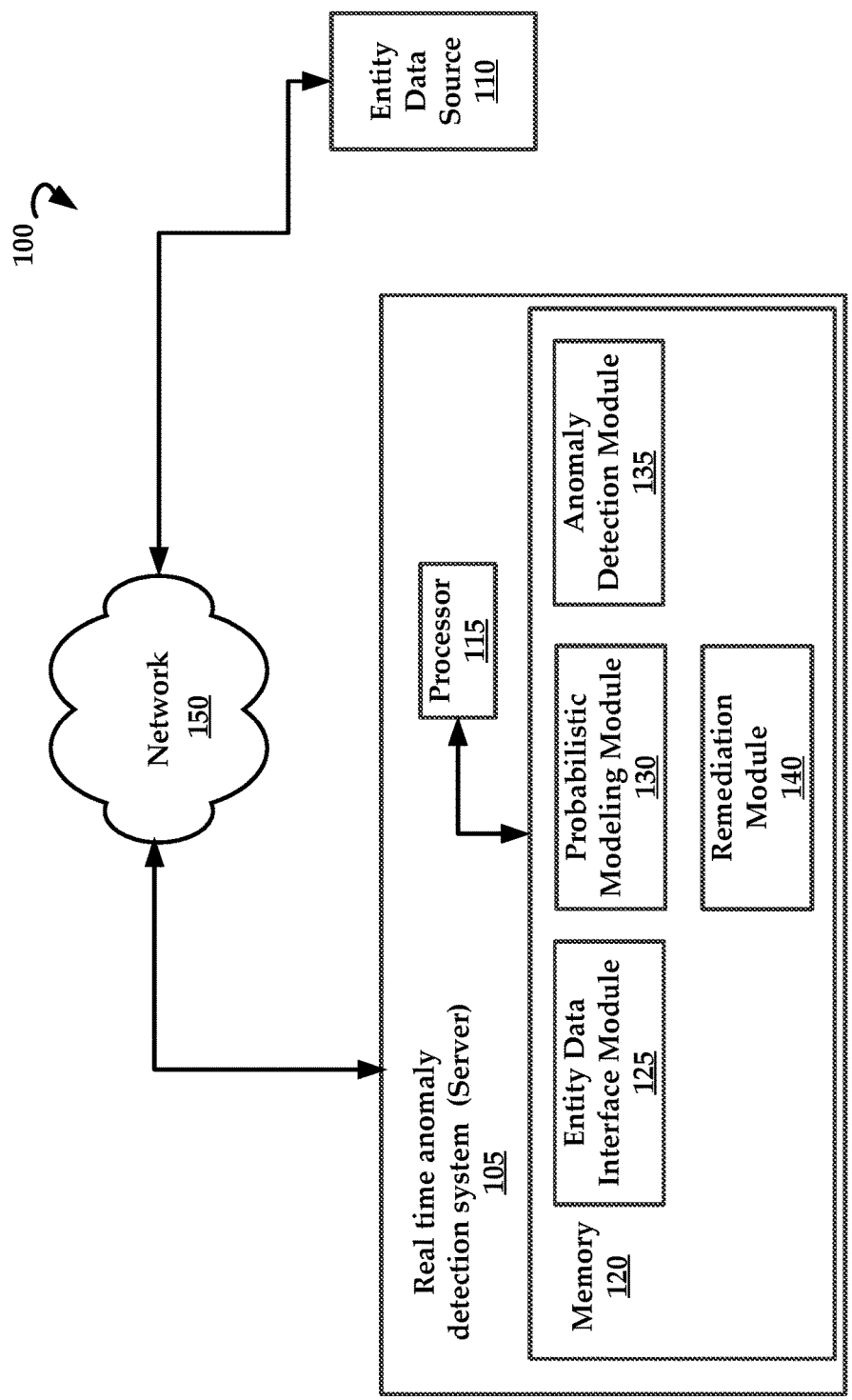
FIG. 1 is a high level schematic diagram of an example computing architecture for practicing aspects of the present technology.

The present disclosure is directed to various embodiments of systems and methods that evaluate behaviors of an entity over a period of time using unsupervised machine learning to detect anomalous behavior. In various embodiments, anomalies can be detected from entity data in a self-referential manner, meaning that anomalies are detected by changes in the entity data over time. In some embodiments, anomalies are detected by comparing the entity data for the entity to entity data of other similar entities in a population, where the behaviors of the population of entities are determined to be normal or expected. Thus, deviations from the normal or expected behaviors can be determined to be anomalous.

According to some embodiments, a population probabilistic model (e.g., profile) in a computing system is constructed from entity data including such inputs as log data, DNS lookups, data exfiltration, and network connections by process—just to name a few. Probability models may be constructed over time for one or more users in a computing environment (e.g., a network, an enterprise, etc.). Individual user activity may be compared to a population profile in real time, and behavioral activity that exceeds a probabilistic threshold when compared against the population profile can be determined to be a behavioral threat. The probabilistic threshold is understood as being indicative of a chance of a member of a population randomly behaving in a particular manner (which is low).

In more detail, probabilistic modeling in some embodiments is used to model behavior over time and probabilistic thresholds are applied to detect anomalies. For example, if a server services an average number of requests for content over a period of time, unusually large spikes in resource requests may be flagged as anomalous. It will be understood that an anomaly may not always associated with malicious behavior. For example, the spike resource requests may be explainable and benign. Thus, the anomaly detection methods in various embodiments disclosed herein detect anomalies, which can be further investigated to determine if the anomaly is malicious or not.

In some embodiments, anomalies can be determined as potentially malicious if multiple anomalies are detected in the probabilistic model for an entity. For example, if a first anomaly is detected that indicates that the entity (such as an end user computing system) is exfiltrating data in large amounts to a destination outside a firewall that the entity operates behind, and additional anomalies are detected such as unusual login locations or unexpected users logging into the entity, the entity can be flagged as a likely malicious actor. The determination of malicious behavior or even anomalies can be dependent upon the entity and behaviors of the entity. Thus, various principles of the present disclosure can be applied to a wide variety of entity types to discover anomalies and malicious behaviors. Therefore, the examples provided herein are not meant to limit the application of the present disclosure in ways that would be contemplated by one of ordinary skill in the art with the present disclosure before them.

These and other advantages of various embodiments of the present technology are provided below with reference to the collective drawings.

FIG. 1 is a high level schematic diagram of an example computing architecture (hereinafter architecture 100) of the present technology. The architecture 100 in this example comprises an example real time anomaly detection system 105 (hereinafter also referred to variously as system 105 or example system 105), which, in some embodiments, comprises a server or cloud-based computing device configured specifically to perform the analyses described herein. That is, the example system 105 is a particular purpose computing device that is specifically designed and programmed (e.g., configured or adapted) to perform any of the methods described herein.

The example system 105 can be coupled with an entity data source 110 that provides an entity data to the system 105. An entity data source 110 can comprise, for example, a computing system, an enterprise network, a plurality of computing systems arranged as a network, virtual machines, application(s), network tap(s), services, a cloud, containers, or other similar computing environment that creates data instances. The entity data collected can comprise direct behaviors of the entity itself, such as collecting log data, DNS lookups, data exfiltration, network connections by process type, and so forth. These types of data can be gathered directly from the entity creating the entity data. The entity can also comprise indirect information. For example, entity data regarding an individual can be collected from many sources such as security systems, computer logins, as well as other entity data sources used by an entity that are indicative of user behaviors.

In one embodiment, the system 105 comprises a processor 115 and memory 120 for storing instructions. The memory 120 can include an entity data interface module 125, a probabilistic modeling module 130, an anomaly detection module 135, and a remediation module 140. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In some embodiments, the system 105 receives entity data from the entity data source 110 via the entity data interface module 125. Entity data can comprise any combination of data collected from any number of sources that will assist in identifying whether an entity is behaving in an anomalous manner or is potentially malicious.

In various embodiments, the individual data instances (or components thereof) are time stamped so that a chronological order can be maintained for the data instances.

In various embodiments, using unsupervised machine learning, the system 105 can evaluate the entity data over time to detect anomalous behavior. Various embodiments allow the system 105 to detect and potentially remediate zero day threats by detecting abnormal variations (anomalies) in entity data in either a self-referential manner or when compared to other similar entities in a population. That is, the entity data for an entity can be modeled and compared against modeled entity data for a population of similar entities. In various embodiments, the population of similar entities is considered similar to the entity when a sufficient number of attributes are shared between the entities in the population and the entity under evaluation.

In some embodiments, the entity data can comprise attributes and attribute values collected over time. Examples include the devices of the end user, how the end user utilizes those devices, how the end user utilizes the resources online (e.g., the Internet) such as the URIs they visit, how the end user utilizes the enterprise resources such as the machines they log in to, and so forth. In some embodiments, an attribute and its corresponding attribute value can be stored as pairs. For example, a login time is an attribute, while the login time of 08:00 is the attribute value.

In general, anomalous behavior may include any deviation in the entity data as viewed over time. For example, if the entity data are collected for an individual end user, changes in login locations, device usage, network usage, data transmission, and so forth can be identified as anomalous. Unexpected changes in entity behaviors may be flagged as anomalous.

In various embodiments, the inclusion of unsupervised machine learning can provide for the system 105 to evaluate only the entity data available and examine these data instances for anomalous behavior in a self-referential manner. That is, in various embodiments, the data instances are modeled for the time period for which data instances are collected and these data instances are used without referencing pre-generated behavior profiles (probabilistic models) or other similar profiles. The use of probabilistic models is advantageous in some embodiments, if available, but these probabilistic models are not required.

Changes in entity data over time can be flagged as anomalous if the changes have a magnitude that is unexpected. In various embodiments, the system 105 need not rely on rigid thresholds or rules for determining if changes in the entity data are anomalous, but such information can be used to confirm or validate the anomaly. Again, the use of thresholds or rules is not required in various embodiments, but is also not prohibited.

In some embodiments, the probabilistic modeling module 130 is executed to create a probabilistic model of entity data for an entity, where the entity data is collected over a period of time. In various self-referential embodiments, the probabilistic modeling module 130 creates the probabilistic model for the entity only.

In some embodiments, the probabilistic modeling module 130 creates the probabilistic model for the entity and also creates a probabilistic model for a population of entities that are similar to the entity under review. These entities (and the model(s) created therefrom) may be considered a control or baseline that is used to create a probabilistic model that can be used as a comparison tool relative to the probabilistic model for the entity.

The probabilistic model for both the entity and the population can be created using any known methods. For example, clustering the data, capturing a parametric description of the typical deviation of values around each cluster, using, by way of example, a covariance matrix, and describing the overall density function as a weighted sum of normal density functions.

In some embodiments, the probabilistic model for the population is a model that is an aggregate or average of the entity data included therein. For example, if there are 50 entities in the population, the probabilistic model for the population is created from all of the values for the 50 entities and is indicative of or represents average behavior of the entities in the population. In various embodiments, the method averages over values observed in the population as the probability model effectively counts examples of the different values in this larger data set. Values which co-occur for different entities are thus assigned high probability in the population model in some embodiments.

In some embodiments, sub-populations and models can be created and utilized. An administrator or end user may select how similar the attributes need to be between an entity and a population for a comparison of probabilistic models to yield meaningful results. For example, users in similar roles in an enterprise are likely to have many similarities, whereas computing processes (another example entity) for network traffic distribution and computing processes of virtual machines in a cloud that provide access to enterprise services may have relatively few similarities.

The anomaly detection module 135, in various embodiments, is executed to evaluate the probabilistic modeling for both self-referential embodiment, as well as comparative embodiments. In comparative embodiments, the anomaly detection module 135 can select and apply differential thresholds for detecting anomalies. These methods are explained in greater detail below with respect to the flowcharts of FIGS. 2-3.

In some embodiments, once an anomaly has been detected and a cause or causes isolated, the remediation module 140 is executed to remediate the cause or causes. The specific methods, in some embodiments, by which the remediation module 140 remediates a cause are highly dependent upon the type of anomaly detected. For example, if the anomaly includes a high rate of access to a particular database, the remediation module 140 may restrict access privileges for the database until the anomaly is reviewed. If the anomaly is unusually frequent file transfers (e.g., exfiltration) of high volumes of data outside a protected network, the remediation module 140 may restrict file transfers by specifically identified machines in the network. This could occur through changing firewall policies or preventing access to any external network by the machines.

Figure 2:
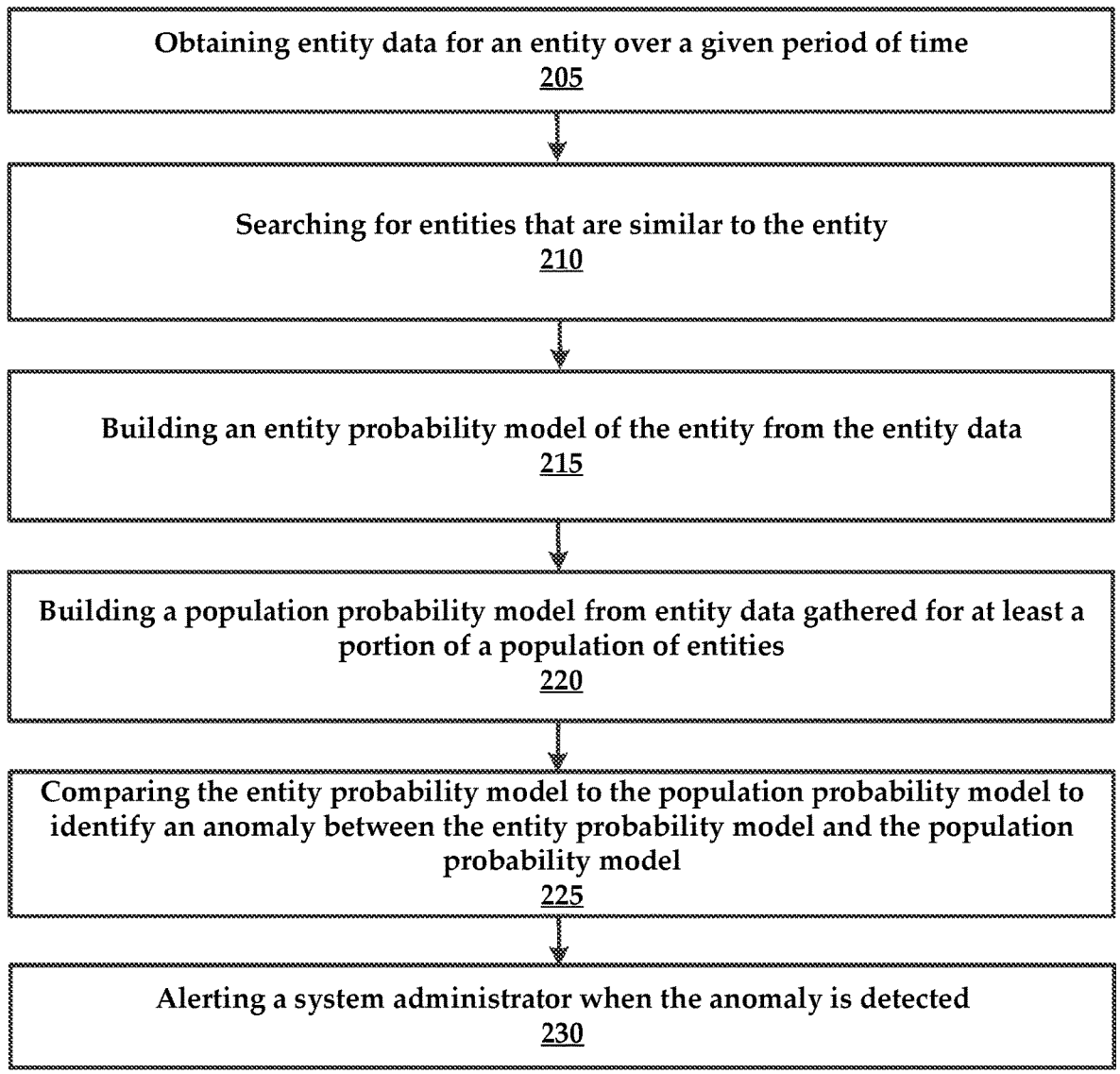
FIG. 2 is a flowchart of an example method for real time detection of anomalies with respect to one or more entities.

FIG. 2 is a flowchart of an example method 200 for real time detection of cyber threats. The example method 200 of FIG. 2 is indicative of a method that compares an entity to a portion (or potentially all) of a population of entities. The entities selected may be based on commonalities in attributes between the entity and the population of entities. In some embodiments, the population of entities is created in response to determining the attributes included in the entity data of an entity. For example, the system 105 may look for entity records for entities that are similar in attributes to the entity under evaluation, and may create the population from these located entities.

In various embodiments, the method steps disclosed herein are executed in real time, meaning that the steps are executed as entity data is received. This can include receiving entity data as the entity data is created. For example, as the user logs on, log on information is transmitted to the system 105. Additional data is collected, in various embodiments, in accordance with the type of anomaly analysis being performed. That is, the set of attributes of the entity that are collected (collectively referred to as entity data) can be selected by an administrator or user. In some embodiments, all attributes of the entity are collected.

The example method 200 may comprise a step 205 of obtaining entity data for an entity over a given period of time. In various embodiments, the entity data can be categorical and/or numerical. For example, a categorical value is non-numerical data such as a username, a location, and so forth.

Next, the example method 200 can execute a step 210 of searching for entities that are similar to the entity. Again, similarity can include any desired amount of correspondence between attributes of an entity and other entities that comprise a population of entities.

Once the population of entities is determined, the example method 200 can further comprise a step 215 of building an entity probability model of the entity from the entity data. In one example, if the entity is a network process such as network traffic, a probability model is created from network traffic collected over the defined period of time.

Next, the example method 200 comprises a step 220 of building a population probability model from entity data gathered for at least a portion of a population of entities. The population probability model, in various embodiments, is indicative of behaviors for the population of entities. This step 220 may be optional as probability models may already exist for the entities located during the searching step 210.

In one or more embodiments, the example method 200 includes a step 225 of comparing the entity probability model to the population probability model to identify an anomaly between the entity probability model to the population probability model. Deviations between the entity probability model and the population probability model can be flagged as anomalous and subject to further review. For example, if the population probability model for network traffic volume shows predictable and repeating traffic patterns and the entity probability model shows a deviating increase in network traffic or an irregular pattern of network traffic when compared to the population probability model, the deviation(s) is flagged as anomalous.

In some embodiments, the deviation is not considered anomalous unless the anomaly meets or exceeds (or falls below in some instance) a probabilistic threshold. For example, if the network traffic difference detected is greater than 125% of normal network traffic, the entity is flagged as anomalous.

In some embodiments, if at least one attribute of the entity probability model has a value that exceeds the probabilistic threshold, the at least one attribute is categorized as being an anomaly. Multiple attributes can be examined using this process.

Regardless of the anomaly detected or the number of anomalies detected, the example method 200 can include a step 230 of, in response to the anomaly being detected (e.g., identified), alerting a system administrator. In some embodiments, this alerting step can comprise a process of converting the anomaly into a normalized threat value which can include a number from zero to 100 with zero indicating no likely threat.

According to some embodiments, a normalization algorithm can comprise a mapping of probabilities computed to an anomaly factor, which ranges from 0 to 100. In some embodiments, this process uses a function that changes quickly for probabilities greater than a specified cutoff probability and then much more slowly for smaller probabilities, where it is desirous to be less sensitive to the exact value of the probability since all such values are highly unlikely. An example equation can be used:

$$\min\left(k\frac{p_c}{p}, -k\,\ln\!\left(\frac{p}{ep_c}\right)\right)$$

where $p_c$ is a cutoff probability.

In some embodiments, the method includes maintaining a fixed sized sketch data structure that allows us to query for quantiles of the historic anomaly factors up to some error that depends on the memory used by the data structure. One example implementation for this data structure is described herein. This data structure can be adapted to support aging out historical values so that it provides a time windowed quantiles for the more recent anomaly factors. In some embodiments, the data structure is used to obtain an approximate rank for each anomaly factor and upper bound the normalized score for the anomaly by a score for its rank. This means that, over the time frame of the window, the score for a rank r, will not be exceeded, for more than the proportion $$1 - \frac{r}{n}$$

of the n results in the window, in some embodiments.

In some embodiments, a comparison of the entity probability model to the population probability model further comprises comparing the attributes of the entity with attributes of the population of entities. Thus, many data points for an entity can be evaluated such as logon times, logon locations, logon duration, and so forth. These attributes can be evaluated along with network resource utilization, device usage, and so forth.

According to some embodiments, when one or more anomalies are identified, the presence of the anomalies may indicate that the entity is malicious or involved in malicious behavior. Again, this may not be directly determined from the presence of one or more anomalies in some instances. To create a more robust examination of the entity and/or to confirm or validate the entity as being malicious, the system 105 can look for other anomalies in the entity data. To be sure, in accordance with various embodiments, as the number of anomalies for an entity increase, the likelihood of the entity being malicious increases.

In some embodiments, the process of identifying additional anomalies comprises locating additional attributes that are anomalous. Thus, if only a few attributes were initially evaluated, if an anomaly is detected, the method can include assessing other attributes not considered in the original evaluation. This allows the systems and methods, according to various embodiments, to prioritize the evaluation of attributes that are more likely to be indicative of malicious behavior rather than forcing the system to evaluate all attributes of an entity.

As mentioned above for various embodiments, the entity and the population of entities have at least a portion of their attributes in common with one another such that a comparison between the entity and the population of entities can be obtained.

According to some embodiments, the systems and methods disclosed herein provide second order analyses for entities. For example, if multiple entities are determined to have one or more anomalies, the method can include grouping the entity with a portion of the additional entities that are determined to have similar anomalies. Again, this can be done at the level of shared attributes. This group of entities may be referred to as a peer group.

In various embodiments, the concept of a peer group is determined by clustering the entity distributions and thus it includes learning the subset of the all entities that are desired to use to define the population probability model for a given entity. For example, this can automatically identify different types of users of a computer network such as programmer, sales person, IT administrator, and so on based on their usage patterns of the network, i.e., it is defining the subset as described supra.

In some embodiments, a plurality of population probability models can be created for subsets of entities that share a specific attribute with one another. For example, entities that have a specific clearance level can be grouped together and probabilistic models can be created for each of these groups of entities.

FIG. 3 illustrates an example self-referential method 300 of real time detection of cyber threats. In some embodiments, the example method 300 comprises a step 305 for building an entity probability model of an entity using attributes of the entity collected over a period of time. Next, the example method 300 includes a step 310 of establishing a control entity probability model. In some embodiments, the control model is associated with a portion of the period of time. For example, the control model can be created from the first section of the entity data collected. If the time period is two hours, the control portion may include, for example, the first fifteen minutes of entity data. As with various other embodiments, the entity data is time stamped to preserve chronological information. Other control portions can be established as desired. In various embodiments, the control portion establishes a baseline for later comparison.

According to some embodiments, the example method 300 comprises a step 315 of comparing an entity probability model for other portions of the period of time to the control entity probability model to identify one or more anomalies in real time. In various embodiments, this comparison is self-referential as the control entity probability model is compared against the model for the other remaining portions of the period of time.

In some embodiments, one or more anomalies are detected by a difference between the control entity probability model and the additional entity probability model that exceeds a probabilistic threshold.

In response to one or more anomalies being detected (e.g., identified), the example method 300 includes a step 320 of executing a remediation action with respect to the entity based on detection (e.g., identification) of the one or more anomalies. In some embodiments, the remediation action is taken in accordance with the one or more anomalies that are detected. For example, if the anomaly indicates that the user is exfiltrating data to a third party, the remediation can include disabling the computing device of the entity or terminating network access of the entity.

Figure 4:
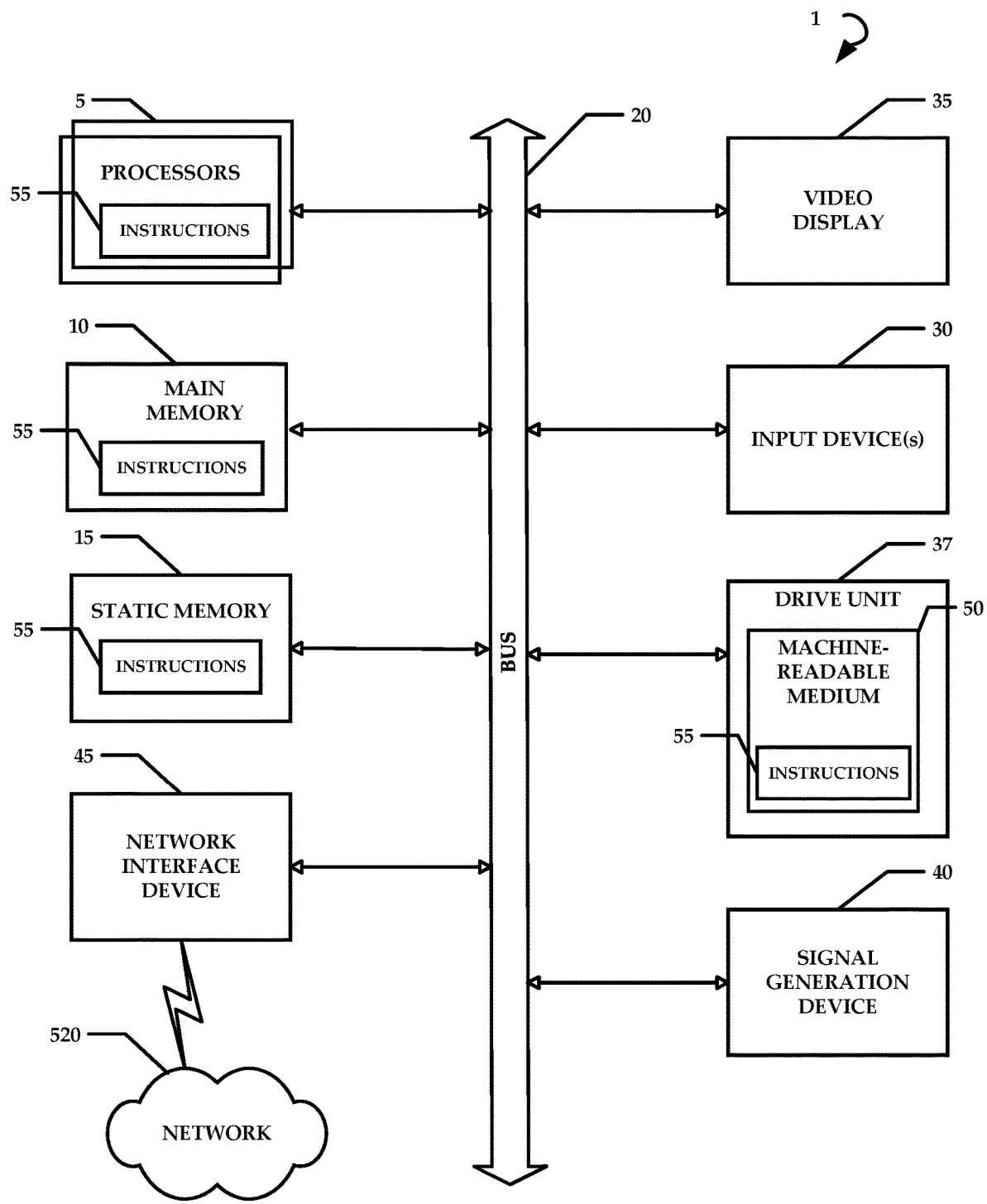
FIG. 4 is a schematic diagram of an example computing system that may be used to implement various embodiments according to the present technology.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 150 or network 520, see FIG. 1 and FIG. 4, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for real time detection of cyber threats within networked devices, the method comprising:
  receiving by a processor from a network, in real time, entity data including two or more attributes for an entity, wherein one of the two or more attributes is a categorical attribute and one of the two or more attributes is a numerical attribute;
  computing by the processor, in real time, two or more entity probability models for each of the two or more attributes of the entity from the entity data, the two or more entity probability models being self-referential and computed using only the entity data that corresponds to the entity;
  selecting, by the processor, based on a number of shared attributes, a portion of a population of entities that are similar to the entity;
  computing, by the processor, two or more population probability models, associated with each attribute from the entity data gathered for at least a portion of a population of entities, the two or more population probability models being indicative of behaviors associated with the two or more attributes for the population of entities;
  comparing, by the processor, in real time, at least a portion of the entity data or at least a portion of the two or more entity probability models to the two or more population probability models associated with each of the two or more attributes to identify an anomaly between the at least a portion of the entity data or the at least a portion of the two or more entity probability models and the two or more population probability models, the anomaly comprising two or more anomalous differences;
  mapping probabilities computed to an anomaly factor that ranges from 0 to 100, by applying a function that changes more rapidly for the probabilities greater than a specified cutoff probability as compared to the probabilities that are smaller;

obtaining an overall probability to create a threat score by computing a fixed sized sketch data structure that can be queried for quantiles of historical anomaly factors up to an error related to memory used by the fixed sized sketch data structure;

adapting the fixed sized sketch data structure to age out historical values and provide time windowed quantiles for recent ones of the historical anomaly factors; and in response to the anomaly being identified, alerting, in real time, a system administrator of a cyber threat.

2. The method of claim 1, wherein comparing by the processor the two or more entity probability models to the two or more population probability models further comprises comparing by the processor the two or more attributes of the entity with associated attributes of the population of entities.

3. The method of claim 1, wherein the comparing by the processor further comprises applying by the processor a probabilistic threshold for each attribute, and wherein, if at least one attribute of the two or more entity probability models has a value that exceeds the probabilistic threshold for the at least one attribute, the at least one attribute is categorized by the processor as being the anomaly.

4. The method of claim 3, further comprising determining by the processor if the anomaly is indicative of the entity being associated with malicious behavior by identifying by the processor additional anomalies linked to the anomaly.

5. The method of claim 4, wherein identifying by the processor additional anomalies comprises locating by the processor additional attributes that are anomalous.

6. The method of claim 5, wherein, as a number of the additional attributes are determined by the processor to be anomalous, a likelihood of the entity being associated with malicious behavior increases.

7. The method of claim 1, wherein the entity and the population of entities have at least a portion of their attributes in common with one another such that a comparison between the entity and the population of entities can be obtained by the processor.

8. The method of claim 7, further comprising:
performing the steps of claim 1 for additional entities; and
grouping by the processor the entity with a portion of the additional entities that are determined to have similar anomalies.

9. The method of claim 1, wherein the two or more entity probability models for each of the attributes and the two or more population probability models are created by the processor over a period of time.

10. The method of claim 1, wherein the entity comprises any of a process, a service, a computing device, a network, an end user, a host, and any combinations thereof.

11. The method of claim 1, further comprising creating by the processor a peer group from the population of entities, wherein the peer group comprises entities that have similar anomalies to one another.

12. The method of claim 11, further comprising:
calculating by the processor an overall probability for the similar anomalies of the peer group; and
determining by the processor whether the entity is malicious based at least on the overall probability for the similar anomalies of the peer group.

13. The method of claim 1, further comprising:
determining by the processor a set of anomalies for the entity, the set of anomalies comprising the anomaly and additional anomalies for the entity; and
calculating by the processor an overall probability for the set of anomalies to determine if the entity is malicious.

14. The method of claim 12, further comprising normalizing by the processor the overall probability to create the threat score.

15. The method of claim 1, further comprising generating by the processor a plurality of population probability models for subsets of entities that share a specific attribute with one another.

16. The method of claim 1, wherein the two or more attributes are associated with direct behaviors, wherein one of the direct behaviors is data exfiltration through a firewall and another of the direct behaviors is network connections.

17. A system for real time detection of cyber threats, comprising:
a processor; and
a memory for storing executable instructions, the processor executing the instructions to:
receive from a network, in real time, entity data including two or more attributes for an entity within a population of entities in real time, wherein one of the two or more attributes is a categorical attribute and one of the two or more attributes is a numerical attribute;
compute, by the processor, two or more entity probability models of the entity from the entity data, the two or more entity probability models being self-referential and computed using only the entity data that corresponds to the entity;
select, by the processor, based on a number of shared attributes, a portion of a population of entities that are similar to the entity;
compute by the processor two or more population probability models from entity data gathered for at least a portion of the population of entities, the two or more population probability models being indicative of average behavior for the population of entities;
compare, by the processor, the two or more entity probability models to the two or more population probability models to identify one or more anomalous differences between the two or more entity probability models and the two or more population probability models;
map probabilities computed to an anomaly factor that ranges from 0 to 100, by applying a function that changes more rapidly for the probabilities greater than a specified cutoff probability as compared to the probabilities that are smaller;
obtain an overall probability to create a threat score by computing a fixed sized sketch data structure that can be queried for quantiles of historical anomaly factors up to an error related to memory used by the fixed sized sketch data structure;
adapt the fixed sized sketch data structure to age out historical values and provide time windowed quantiles for recent ones of the historical anomaly factors;
in response to identification by the processor of the one or more anomalous differences, alert a system administrator; and
in response to the one or more anomalous differences, alert, in real time, the system administrator of a cyber threat.

18. The system of claim 17, wherein the processor is configured to execute instructions to obtain an approximate rank for each of the historical anomaly factors and determine an upper bound for the threat score for the each of the historical anomaly factors by a ranking score.

19. The system of claim 17, wherein the compare step, by the processor, the two or more entity probability models to the two or more population probability models further comprises comparing by the processor the two or more attributes of the entity with associated attributes of the population of entities.

20. The system of claim 17, wherein the compare step, by the processor, further comprises applying by the processor a probabilistic threshold for each attribute, and wherein, if at least one attribute of the two or more entity probability models has a value that exceeds the probabilistic threshold for the at least one attribute, the at least one attribute is categorized by the processor as being an anomaly.

* * * * *